United States Patent [19]
Haraguchi

[11] 3,897,268
[45] July 29, 1975

[54] DRY CELL MAGAZINE
[75] Inventor: Keisuke Haraguchi, Kamifukuoka, Japan
[73] Assignee: Asahi Kogaku Kogyo Kabushiki Kaisha, Tokyo, Japan
[22] Filed: Mar. 22, 1974
[21] Appl. No.: 453,573

[30] Foreign Application Priority Data
Mar. 30, 1973  Japan .............................. 48-38667

[52] U.S. Cl. .............................................. 136/173
[51] Int. Cl. ............................................. H01m 1/04
[58] Field of Search .................................... 136/173

[56] References Cited
UNITED STATES PATENTS

| | | | |
|---|---|---|---|
| 2,213,768 | 9/1940 | Merriman et al. | 136/173 |
| 3,445,297 | 5/1969 | Sidell | 136/173 |
| 3,535,996 | 10/1970 | Winkler et al. | 136/173 |
| 3,542,603 | 5/1968 | Simon | 136/173 |

*Primary Examiner*—Donald L. Walton
*Attorney, Agent, or Firm*—Knobbe, Martens, Olson, Hubbard & Bear

[57] ABSTRACT

A dry cell magazine with a movable contact plate elastically urging a dry cell against a fixed contact in order to securely hold the dry cell between the two contacts. A seesaw lever is mounted adjacent the movable contact plate for restraining the contact plate in an open position. The dry cell magazine has a cover member which engages an operation plate when the cover member is closed on the dry cell magazine. The cover member, operation plate, seesaw lever and movable contact plate are cooperatively arranged in such a manner that upon shifting the operation plate in one direction, the cover member is released from the operation plate and swings up and the movable contact plate is moved until it is retained by the seesaw lever.

6 Claims, 8 Drawing Figures

PATENTED JUL 29 1975

3,897,268

SHEET 1

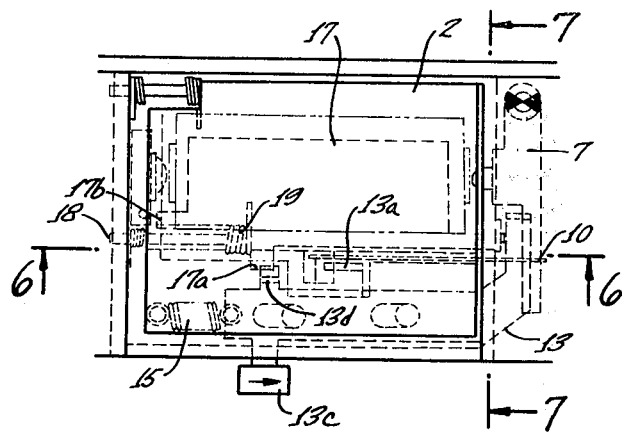
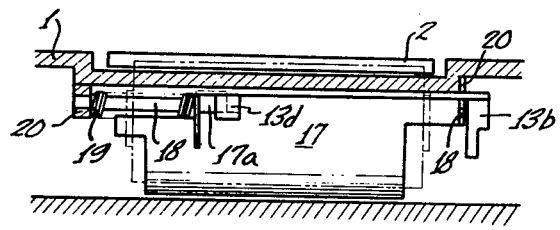
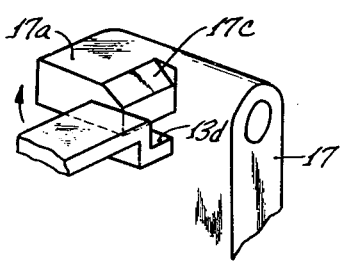
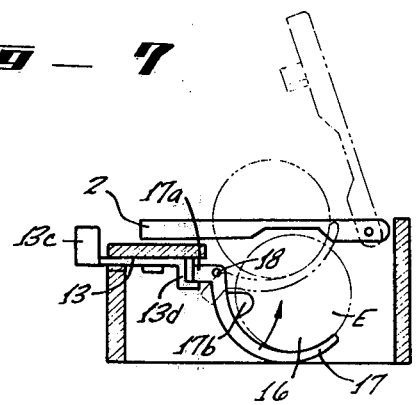

3,897,268

DRY CELL MAGAZINE

BACKGROUND OF THE INVENTION

This invention relates to the field of receptacles for dry cells which are used in a wide variety of battery operated equipment and devices. In prior art devices the design and construction of these receptacles have had the disadvantage of making it difficult to insert and remove the dry cell. The contact areas in the prior art receptacles are usually spring biased in a direction toward each other to provide secure contact with the ends of the dry cell. However, insertion is awkward because the dry cell battery must be forced into a position between the contacts. Also, extended use of the receptacle may cause the springs to be deformed from repeated insertion and removal. Removal of the dry cell battery is also quite awkward, since in many instances the receptacle is quite small leaving little room for an individual to grasp the battery to remove it from its tight orientation.

SUMMARY OF THE INVENTION

This invention is designed to provide a dry cell magazine for use in a wide variety of battery operated devices and incorporates features to promote easier loading and unloading of the dry cell. In addition, the design assures a good electrical contact between the dry cell and the contact points of the receptable.

The dry cell magazine described herein utilizes a movable contact plate which is automatically disengaged from one end of the dry cell when the cover plate of the magazine is opened. This allows simple removal, because one end of the battery is free within the magazine. The operation of the dry cell magazine is simplified, since the movement of an operation plate performs simultaneously the operation of opening the cover member, moving the contact plate out of engagement with the dry cell battery and restraining the contact plate in an open position.

An alternate embodiment of the invention utilizes a cell case in which the dry cell battery is held in the dry cell magazine. This cell case also operates in response to the operation plate which causes the cell case to move up adjacent the open cover member to expose the dry cell battery partially out of the dry cell magazine, facilitating easier removal of the dry cell battery.

BRIEF DESCRIPTION OF THE DRAWINGS

FIG. 5 is a plan view of the dry cell magazine showing a second embodiment of this invention;

FIG. 6 is a partial sectional view of the dry cell magazine taken along the lines 6—6 in FIG. 5;

FIG. 7 is a partial sectional view of the dry cell magazine taken along the lines 7—7 in FIG. 5; and FIG. 8 is an enlarged perspective view of the cell case arresting mechanism;

DETAILED DESCRIPTION OF THE INVENTION

Figure 1:
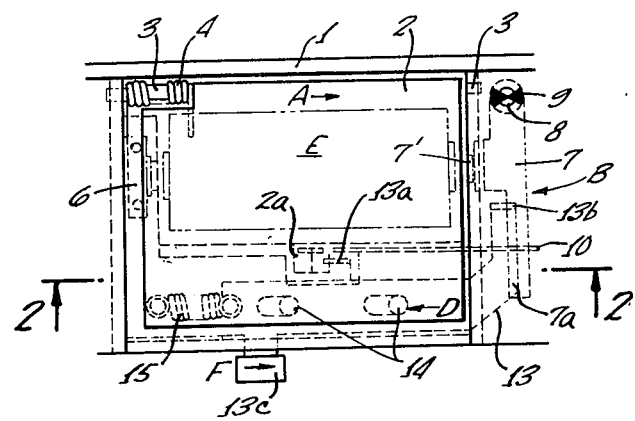
FIg. 1 is a plan view of the dry cell magazine showing one embodiment of this invention.
Figure 2:
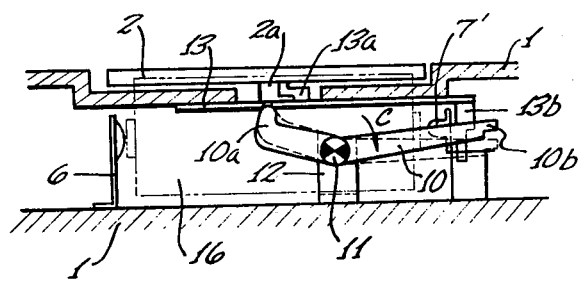
FIG. 2 is a sectional view of the dry cell magazine taken along lines 2—2 in FIG. 1.
Figure 3:
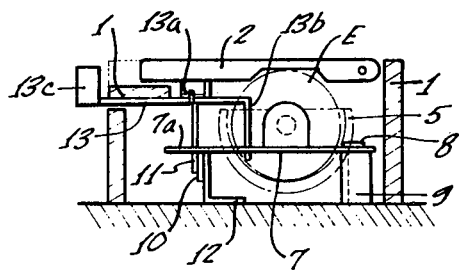
FIG. 3 is an end view of the dry cell magazine in FIG. 1.

Referring first to FIG. 1, there is shown a dry cell magazine according to the first embodiment of this invention. Indicated at 1 is a casing of an apparatus which forms a part of the dry cell magazine of this invention. The magazine is provided with a cover member 2 which has a projection 2a formed on its inner surface and is pivoted on a shaft 3, so that it is swingable up and down around the shaft 3. A coil spring 4 urges the cover member 2 both in its swinging-up direction and in the direction of arrow A. With respect to FIG. 3, mounted in a fixed position in the apparatus casing 1 is a dry cell case 5 which has an approximate semi-circular cross section and is provided as shown in FIG. 2 with at one end a fixed contact 6 and at the other end a movable contact plate 7.

In FIG. 1, the movable contact plate 7 includes a contact 7' and an extended end 7a, and is pivoted on an axis 8 which is fixed on a boss 9 protruded from the bottom of the apparatus casing 1. Although not shown, the movable contact plate 7 is urged in the direction of arrow B, so that it presses the dry cell E against the fixed contact 6 to hold the dry cell E therebetween. In FIG. 2 a seesaw lever 10 is pivoted at 11 on an angle bracket 12 which is fixed on the bottom of the apparatus casing 1. The seesaw lever 10 is urged in the direction of arrow C, so that it is swingable around the axis 11 clockwise as viewed in FIG. 2. An end of the seesaw lever 10 is arranged in opposition to the projection 2a formed on the cover member 2 and a stepped portion 10b formed on the other end of the seesaw lever 10 is in opposition to the extended end 7a of the movable contact plate 7.

Figure 4:
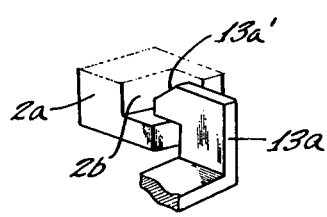
FIG. 4 is an enlarged perspective view of the cover arresting mechanism.

In FIG. 1 a manual operation plate 13 is guided by a pair of guide pins 14 fixed on the apparatus casing 1 and normally pulled by a compression coil spring 15 in the direction of arrow D. The operation plate 13 is provided with a hook 13a arranged in opposition to said projection 2a, a bent end 13b which is in opposition to said extended end 7a and a manual operation knob 13c which extends outwardly of the apparatus casing 1. In FIG. 4 the hook 13a has an inclined top surface 13a', so that, when the cover member 2 is closed, the hook 13a rides over the projection 2a to be automatically engaged in the arresting groove 2b formed in the projection 2a.

According to the present embodiment with respect to FIG. 1 when the dry cell E is to be loaded, the knob 13c is first pressed with finger in the direction of arrow F against the compression force of the coil spring 15 to shift the operation plate 13 along the guide pins 14. This movement of the operation plate 13 accompanies the movement of the hook 13a which is integral with the operation plate 13. The hook 13a is, therefore, disengaged from the arresting groove 2b of FIG. 4 formed in the projection 2a. As a result, the cover member 2 in FIG. 1 is released and swung up around the shaft 3 by the action of the coil spring 4. When the operation plate 13 moves in this way, the bent end portion 13b of the operation plate 13 acts on the movable contact plate 7, so that the latter rotates around the axis 8 counterclockwise as viewed in FIG. 1. In FIG. 2 the swinging-up movement of the cover member 2 releases the end 10a of the seesaw lever 10, thereby allowing the seesaw lever 10 to rotate in the direction of arrow C. This causes the extended end portion 7a to be arrested by the stepped portion 10b. In other words, the movement of the knob 13 c in the direction of arrow F of FIG. 1 causes the swinging-up movement of the cover member 2, the retreating movement of the movable contact plate 7 and the movement of the seesaw lever 10 simultaneously.

When the pressing force on the knob 13c is removed and the operation plate 13 returns to the original position, the cover member 2 and the movable contact plate 7 are still held in the open position. Therefore, in FIG. 2, when a dry cell E is loaded in the cell case 5 and the cover member 2 is then closed, the projection 2a formed on the inner surface of the cover member 2 presses down the end portion 10a of the seesaw lever 10 and rotates the seesaw lever 10 around the axis 11 in the direction opposite to arrow C. Consequently, the extended end portion 7a is disengaged from the stepped portion 10b and the movable contact plate 7 rotates, due to its restoring elasticity, in the direction of arrow B )FIG. 1), so that the contact 7' is forced to contact with a pole of the dry cell E. At the same time, the bottom surface of the projection 2a in FIG. 4 abuts against the inclined top surface 13a' formed on the hook 13a and presses the hook 13a downwardly to shift the operation plate 13 in the direction of arrow D against the compression force of the coil spring 15 of FIG. 1. At the time when the projection 2a passes over the forward end of the hook 13a and the hook 13a drops in the arresting groove 2b, the cover member 2 is arrested completely. It will be appreciated that the closing operation of the cover member 2 automatically arrests the cover member 2 and establishes an electrical connection between a pole of the dry cell E and the contact 7'.

FIGS. 5 to 8 illustrate a modified embodiment of this invention, wherein like reference numerals designate the parts and components corresponding to those of previous embodiment. Indicated at 17 is a movable case for receiving a dry cell E. The movable cell case 17 is pivoted on a shaft 18 and urged by a coil spring 19 in FIG. 6, so that it is rotatable in the direction of arrow (FIG. 7). The both ends of the shaft 18 are supported by a pair of bearings 20 fixed to the apparatus casing 1. The cell case 17 is provided in FIG. 7 with a projection 17a and a stopper 17b. In FIG. 8 the projection 17a has an inclined top surface 17c which is in opposition to the bent end portion 13d of the operation plate 13, so that, when the cell case 17 is forcedly restored, the bent end portion 13d passes over the inclined top surface 17c until it comes below the projection 17a. In FIG. 7 the stopper 17b is arranged in opposition to a portion of the apparatus casing 1.

In the similar manner to the previous embodiment when the knob 13c is shifted in the arrow direction of FIG. 5 against the action of the coil spring 15, the hook 13a retreats to release the cover member 2. At this time the movable contact plate 7 is shifted and arrested by the seesaw lever 10. The shifting of the bent end portion 13d releases the projection 17a and, hence, the cell case 17 is swung in the arrow direction (FIG. 7) by means of a coil spring 19 and held in a predetermined dry cell removal position (shown in phantom) where the stopper 17b is in contact with the apparatus casing 1. In this position a dry cell E is unloaded or loaded in the cell case 17. In FIG. 7 when the cover member 2 is closed, the dry cell E is first pressed by the inner surface of the cover member 2 and forced to move together with the cell case 17 to a predetermined operating position. Toward the end of such a movement the projection 2a pushes one end of the seesaw lever 10 to thereby retreat the movable contact plate 7 for holding the dry cell E. When the cell case 17 moves in the arrow direction (FIG. 8), the projection 17a on the cell case 17 pushes the bent end portion 13d slightly by means of the inclined top surface 17c until the projection 17a comes above the bent end portion 13d and is arrested by the bent end portion 13d. In FIG. 5 the bent end portion 13d is operated together with the operation plate 13 and restored by the compression force of the coil spring 15. By shifting the knob 13c in one direction, the cover member 2, the movable contact plate 7, and the cell case 17 are operated simultaneously. This facilitates reloading of the dry cell E.

It will be appreciated from the foregoing that a single operation of the knob 13c opens the cover member 2 and releases the pressing mechanism for the dry cell simultaneously and, after inserting or replacing the dry cell, an electrical contact with the dry cell is established automatically upon closure of the cover member.

What is claimed is:

1. A dry cell magazine comprising:
a casing for receipt of said dry cell;
a cover member movably mounted within said casing;
a movable contact plate for engagement with said dry cell; and
means for retracting said contact plate from said engagement with said dry cell and for opening said cover member, said cover member has one edge having an arresting groove which is in contact with said retracting and opening means when said cover member is in a closed position on said casing, said cover member being biased to pivot said one edge out of said contact with said retracting and opening means.

2. A dry cell magazine comprising:
a casing for receipt of said dry cell;
a cover member movably mounted within said casing;
a movable contact plate for engagement with said dry cell; and
a sliding operation plate having one edge in contact with said cover member and a second edge in contact with said contact plate, said cover member moving out of contact with said operation plate and said second edge of said operation plate moving said contact plate when said operation plate is moved in one direction, said operation plate being spring-biased in a direction opposite said one direction.

3. A dry cell magazine comprising:
a casing for receipt of said dry cell;
a cover member movably mounted within said casing;
a movable contact plate for engagement with said dry cell;
means for retracting said contact plate from said engagement with said dry cell and for opening said cover member; and
a seesaw lever having a first end acting in response to said retracting and opening means and a second end adjacent said contact plate, said second end contacting and retaining said contact plate when said first end is retracted by said retracting and opening means, said seesaw lever releasing said contact plate for engagement with said dry cell when said cover member is placed in a closed position on said casing.

4. A dry cell magazine for use with an apparatus having a casing, said dry cell magazine comprising:
- a pair of contacts mounted within said casing for engagement with said dry cell;
- a movable contact plate mounted within said casing, one of said pair of contacts being connected to said contact plate;
- a cover member movably mounted on said casing;
- a slidable operation plate engaging said cover member when said cover plate is in a closed position on said casing; and
- means for retaining said movable contact plate out of engagement with said dry cell, said retaining means operating in response to said operation plate.

5. A dry cell magazine comprising:
- a casing for receipt of a dry cell;
- a fixed contact mounted in said casing; said fixed contact receiving one end of said dry cell;
- a movable contact plate mounted in said casing adjacent the other end of said dry cell, said contact plate biased against said other end of said dry cell for holding said one end of said dry cell against said fixed contact;
- a cover member movably mounted on said casing and biased to pivot to an open position;
- a seesaw lever mounted in said casing adjacent said movable contact plate; and
- an operation plate slidably mounted adjacent said cover member, said operation plate engaging said cover member when said cover member is in a closed position, said operation plate, said cover member, said seesaw lever and said movable contact plate being cooperatively arranged, so that shifting of said operation plate in one direction when said cover plate is in said closed position results in said cover member moving to said open position and results in said contact plate moving away from said other end of said dry cell, said cover member causing said seesaw lever to retain said movable contact plate away from said other end of said dry cell.

6. A dry cell magazine as defined in claim 5 additionally comprises a cell case for receipt of said dry cell and pivotally mounted within said casing, said cell case having a dry cell operating position and a dry cell removal position, said cell case cooperatively arranged with said operation plate, said cover member, said seesaw lever, and said movable contact plate, said cell case pivoting to said removal position in response to said shifting of said operation plate, said cell case moving to said operating position in response to said cover member being moved to said closed position.

* * * * *